United States Patent
Eckhardt

[15] 3,676,773
[45] July 11, 1972

[54] APPARATUS FOR DETECTING ELECTRICALLY CONDUCTIVE PARTICLES USING A GAS PERMEABLE, BUT LIQUID IMPERMEABLE SURFACE

[72] Inventor: Hans A. Eckhardt, 55 Crescent Bend, Allendale, N.J. 07401

[22] Filed: Feb. 3, 1969

[21] Appl. No.: 795,888

[52] U.S. Cl.............................324/41, 200/61.09, 335/305, 340/270
[51] Int. Cl..........................................................G01r 33/00
[58] Field of Search....................324/41; 340/270; 335/305; 200/61.09; 209/39, 40, 213, 214, 215

[56] References Cited

UNITED STATES PATENTS

| | | | |
|---|---|---|---|
| 236,023 | 12/1880 | Hastings | 209/39 |
| 2,252,222 | 8/1941 | Van Os | 324/71 |
| 2,878,342 | 3/1959 | Arthur | 340/270 |
| 3,392,831 | 7/1968 | Eckhardt | 209/40 |
| 3,404,337 | 10/1968 | Pool et al. | 324/41 |
| 3,422,417 | 1/1969 | Lowe | 200/61.09 |
| 1,285,986 | 11/1918 | Grafford | 200/52 F |

FOREIGN PATENTS OR APPLICATIONS 634,43? 4/5035 Germany ............. 324/41

*Primary Examiner*—Rudolph V. Rolinec
*Assistant Examiner*—R. J. Corcoran

[57] ABSTRACT

An apparatus for detecting tramp metal contained in electrically non-conductive fluid material has a surface supporting the fluid material, formed by the ends of the laminae of a laminated magnet alternately connected to the terminals of a battery in a circuit with a current indicator. Tramp metal forming a bridge between the pole ends of two alternate laminae close the circuit and are thus monitored by the current indicator. An opening extends through the laminated magnet traversing the laminae, and the insulation is removed between the opening and the pole ends of the laminae. The opening has a gas-permeable non-conductive liner, so that air introduced into the opening flows through the liner and between the laminae to the surface and into the fluid material. Tramp metal is thus caused to settle downward in the fluidized material.

The magnet has a primary winding which induces into a secondary winding a voltage changed by tramp metal changing the magnetic field, and indicating such tramp metal. A second identical magnet with identical primary winding has an identical secondary winding arranged in a secondary circuit in opposition to and in series with the first secondary winding, so that their induced voltages normally balance each other. Tramp metal upsets the balance and a resultant current flows in the secondary circuit indicating the tramp metal.

23 Claims, 5 Drawing Figures

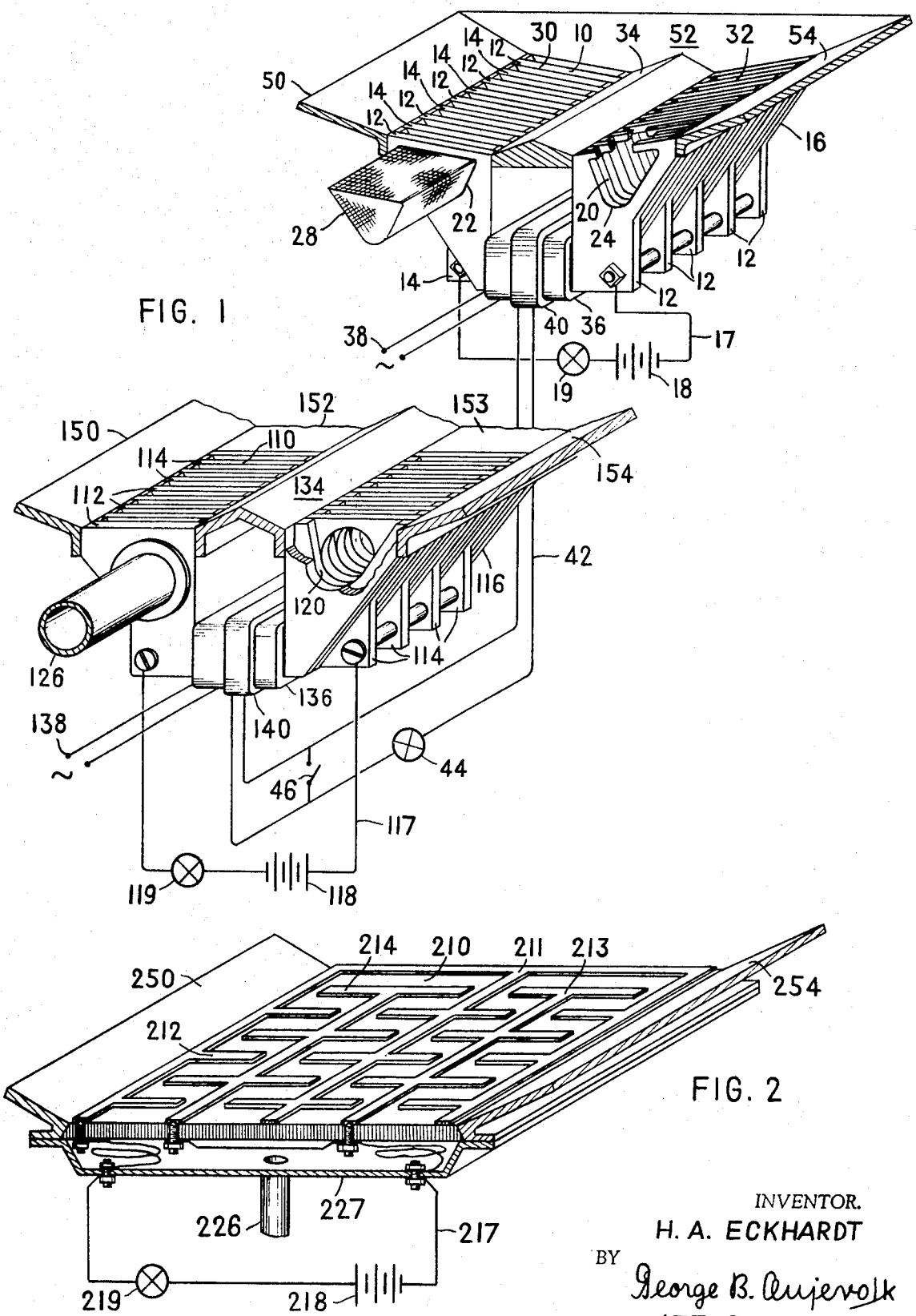

INVENTOR.
H. A. ECKHARDT
BY George B. Oujevolk
ATTORNEY

APPARATUS FOR DETECTING ELECTRICALLY CONDUCTIVE PARTICLES USING A GAS PERMEABLE, BUT LIQUID IMPERMEABLE SURFACE

The present invention relates to apparatus for detecting electrically conductive particles and, in particular, to apparatus for detecting such particles in fluid materials such as powdery, flaky, granular solid materials, liquids, and materials with consistencies in different ranges.

Apparatus of the invention improves the processing of such fluid materials which by accident contain electrically conductive particles, such as chips, filings, screws, bolts, nuts and other tramp metal of steel, bronze, brass, aluminum and other metals, whether they be magnetic or non-magnetic.

Electrically conductive particles such as tramp metal, have again and again caused severe damage to machinery, such as extruders, injection molding machines, blow molding machines, presses, calenders and roll mills, and many other machine types, and especially to their critical expensive portions such as molds, dies, tools and liners.

Aside from the damage to processing equipment, foreign particles enclosed in end products have often made large quantities of a production unusable. The financial losses have been more severe by the lack of efficient methods to check processed products for enclosed foreign particles, and therefore, the production over an extended period of time often had to be scrapped when foreign particles were either actually enclosed or only suspected.

Many attempts have been made to detect and remove foreign particles in fluid materials. One approach is sifting the material through a screen. This method involving an additional operation is only suitable for free flowing materials, but not for more tacky or sticky types. Furthermore, only such foreign particles can be screened out which are larger than the largest particle size of the material to be processed. Very often the processed material particles are relatively large, as with pellets, granules, chips, comminuted plastic and rubber products, and, therefore metal and other foreign particles of comparable size can still damage equipment subsequently, and even more so will cause the rejection of large production quantities.

Another method is the use of magnets in passages for material in form of powder, flake, granules or pellets. It is obvious that only ferro-magnetic particles can be expected to be removed. In the industry, however, stainless steel, bronze, aluminum and other non-magnetic materials are largely used. Bolts, screws, nuts and other elements made of such metals sometimes come loose from equipment or get into the material flow in other ways. Grate magnets or magnetized bars obstruct the flow of material excessively and therefore cannot be used. In addition, it has been found that even ferro-magnetic bodies are not reliably retained by the grate magnets if the gravity forces overcome the magnetic forces.

In another proposal magnets are arranged below a non-metallic conveyor belt carrying the bulk material and detector coils outside and above the bulk material. It is obvious that this arrangement is not applicable to ducts or containers where the height of the bulk material is much larger than on a conveyor belt and a detector coil outside the bulk material would be too far removed from the magnets. Placement of a detector coil within the bulk material is usually not acceptable. In addition the equipment above the magnets and in the vicinity of the detector coils cannot always be constructed of non-magnetic materials to assure sufficient magnetic flux throughout the bulk material. Principally the device has been designed for detecting ferro-magnetic objects, rather than other metals or materials.

In several proposals relating to combustion engines, there are described drain plugs which have a first electrode bolt separated from a second adjacent electrode by an insulator, and a voltage applied between the two electrodes, so that metal parts bridging the insulator cause a current to flow which is then indicated. Even if these electrodes are magnetic, as has been suggested, it is obvious that such a device is not suitable for the bottom surface of bulk containers or conveying ducts for powdery, flaky or granular materials.

Another device proposed for oiling systems has rods at different voltages traversing the cross section of an oil pipe. This proposal is not suitable for ducts carrying powdery, flaky or granular materials, since the rods would excessively obstruct the flow of such solid bulk materials, as their separating distance would have to be sufficiently small to detect and retain small metal particles. A considerably larger distance between these rods would permit satisfactory flow of solid bulk materials, but would detect only rather large pieces of tramp metal, but not the smaller particles which would pass with the bulk material between these rods and which are so detrimental to subsequent processing machinery as well as to the processed product.

Accordingly, it is an object of the present invention to provide an apparatus for detecting electrically conductive particles which eliminates the difficulties heretofore described.

It is an object of the invention to provide apparatus which detects electrically conductive particles forming a bridge between a first electrically conductive network and a second electrically conductive network extending across a surface which supports fluid bulk material containing electrically conductive particles.

It is another object to provide laminated magnets which have first and second laminae alternately connected to an electric energy source, thus detecting electrically conductive particles bridging the insulation between the laminae at the pole surfaces.

It is a further object to provide laminated magnets having openings traversing their laminae and connected to means for introducing air, and having the insulation removed between these openings and the pole surfaces, so that air from these openings flows between the laminae to the pole surfaces and fluidizes the bulk material.

It is another object to provide a laminated magnet having a primary winding which induces into a secondary winding a voltage changed by conductive particles changing the magnetic field so that the change in voltage is used for indicating the presence of conductive particles.

It is another object to provide a second laminated magnet with a primary and a secondary winding, the two secondary windings arranged in opposition to cancel out their induced voltages, so that a conductive particle changing the magnetic field of one of the magnets changes the voltage induced in the secondary winding thereof thus ceasing to balance the voltage induced in the secondary winding of the other magnet resulting in a voltage in the secondary circuit signaling the presence of a conductive particle.

It is a further object to provide electrically conductive first and second elements at different potentials, extending across a gas-permeable surface, so that conductive particles settling to that surface bridge the space between the first and the second elements.

It is another object to provide conductive element insulated from and extending across an air-permeable conductive surface at a different potential, so that conductive particles settling at that surface form a bridge between that surface and these elements.

These and other objects, advantages and features of the invention will be apparent during the course of the following description when taken in connection with the accompanying drawings wherein:

FIG. 1 is a perspective view of one embodiment of the invention, with parts broken away;

FIG. 2 is a perspective view of another embodiment, partly in section;

Figure 3:
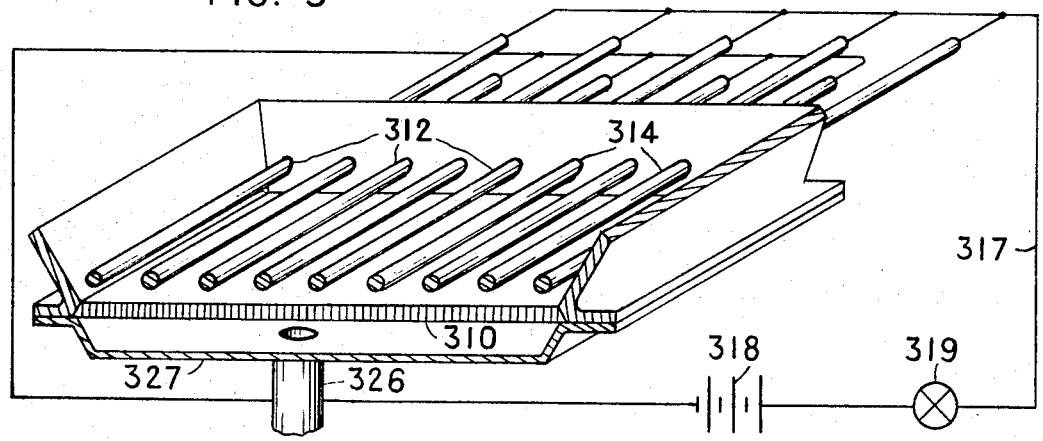
FIG. 3 is a perspective view of a further embodiment partly in section.

Referring to the drawings, FIG. 1, there is shown an apparatus for detecting conductive particles comprising a surface 10 to support electrically non-conductive fluid material containing electrically conductive particles. Electrically conductive first and second elements extending across the surface 10 are the first laminae (No. 1, 3, 5 etc.) 12 and the second (No. 2, 4, 6 etc.) laminae 14 of a laminated magnet 16 alternately connected to the terminals of an electric energy source, the battery 18. The first laminae 12 are separated from the second laminae 14 by insulating spaces comprising the insulation 20 between the laminae 12 and 14.

The insulation 20 between the first laminae 12 and the second laminae 14 extends to a predetermined depth below the surface 10 fOrmed by the laminated magnet 16. Openings 22 and 24 extend through the magnet 16 traversing the laminae 12 and 14, and are connected to means for introducing air or another gas, as illustrated at the comparative magnet 116 by the tubing 126. The insulation 20 between the laminae 12 and 14 is removed between the openings 22, 24 and the surface 10. The opening 22 has a gas-permeable electrically non-conductive liner 28 with passages smaller than the size of the smallest particles of fluid material and of electrically conductive particles. The liner 28 is shown as partly inserted in the opening 22 and consists of a wire screen and porous fabric.

The one pole 30 of the magnet 16 forms one part of the surface 10, the other pole 32 forms another part of the surface 10, and the portion 34 of the surface 10 between the poles 30 and 32 descends in height toward the poles 30 and 32. The pole 30 decreases in height toward the other pole 32, and the pole 32 decreases in height toward the pole 30.

The magnet 16 has a primary winding 36 connected to the alternating current source 38, which induces into a secondary winding 40 a voltage.

A comparative magnet 116 has a primary winding, the comparative primary winding 136, connected to an alternating current source 138 which induces in a secondary winding, the comparative secondary winding 140, a voltage. The secondary winding 140 and the secondary winding 40 are arranged in opposition and in series in a secondary circuit 42, their induced voltages adjusted to cancel each other resulting in zero voltage in the circuit 42, as indicated by the current indicator 44.

The comparative magnet 116 has laminae 112, 114 extending across a surface 110, alternately connected in an electric circuit 117 to two terminals of an electric energy source, the battery 118, and a current indicator 119. The surface portions 34, 50, 52, 54 and 134, 150, 152, 153, 154 are made of electrically non-conductive material such as plastic material. If these surface portions are to be made of metal, they are electrically insulated from the magnets 16 and 116. For the purpose of illustration, the laminae 12, 14, 112, 114 and the insulation 20, 120 are shown thicker than usual or necessary.

In operation, the surface 10 forming the bottom of a container, mixer or conveying duct, supports electrically non-conductive fluid material such as plastic resins, polymeric compounds, food or chemical materials in form of flour, powder, granules, flake, pellets, or chips. Electrically conductive particles such as tramp metal which settle at the surface 10, form a bridge across an insulating space 20 between first laminae 12 and second laminae 14 and close the electric circuit 17, signaling their presence through the current indicator 19, e.g. an electric light.

Air or another gas is introduced into the openings 22, 24, flows through the liner 28 and between the first laminae 12 and the second laminae 14 to the surface 10, and fluidizes the fluid material above the surface 10. Thus the heavier metal particles settle downward much easier. To prevent any particles from entering the openings 22 and 24, the liner 28 is provided with sufficiently small holes or pores.

Since the surface portion 34 descends toward the poles 30, 32, non-magnetic metal particles in the fluidized material are pulled by gravity forces toward one of the poles 30, 32 where they form a bridge across an insulating space 20. Magnetic metal particles are pulled by magnetic and gravity forces toward one of the poles 30, 32 and are detected after forming a bridge across an insulating space 20. Magnetic particles are pulled easier into the strongest portion of the magnetic field by the two poles 30, 32 decreasing in height toward each other.

Magnetic and non-magnetic metal particles getting into the magnetic field of the magnet 16 change the voltage induced in the secondary winding 40. The change in the induced voltage is indicated by the current indicator 44, when the switch 46 is closed.

With the addition of the comparative magnet 116, and the switch 46 open, a metal particle, magnetic or non-magnetic, getting in the magnetic field of one of the magnets 16 (116) changes the magnetic field of that magnet 16 (116) and changes the voltage induced in the secondary winding 40 (140) thus ceasing to balance the voltage induced in the secondary winding 140 (40) of the other magnet 116 (16), and resulting in a current in the secondary circuit 42 and through the current indicator 44, thus indicating the presence of the metal particle.

The apparatus shown can be used for removing the detected metal particles by various means, such as by arranging the apparatus as the hinged bottom of a container, of a machine, or of a duct, and by providing a gate, for example a slide gate, above the apparatus, to retain the fluid material above, when unhinging the apparatus for metal removal.

FIG. 2 shows an apparatus for detecting metal particles comprising a surface 210, which supports fluid material containing metal particles. A first network 211 of electrically conductive first elements 212 extends across the surface 210, and is at a defined electric potential by connection in an electric circuit 217 to one terminal of a battery 218 or another electric energy source. A second network 213 of electrically conductive elements 214 extends across the surface 210, separated from the first network 211 by insulating spaces and is at an electric potential different from that of the first network 211 by connection in the electric circuit 217 to the other terminal of the battery 218.

The first elements 212 and the second elements 214 are in contact with the surface 210 which is electrically non-conductive. The first network 211 and the second network 213 are made of electrically conductive material connected to the surface 210 by printing or bonding, and thus represent printed circuits.

The surface 210 is gas-permeable, and a tubing 226 and a cover 227 are provided for introducing air or another gas through the surface 210 into the fluid material. The cover 227 is made of plastic or other non-conductive material. If it is to be made of metal, all parts of the circuit 217 are to be insulated from the cover 227. The first network 211 and the second 213 are made of porous metal or other gas-permeable material.

For the purpose of illustration, the elements 212, 213 and their distances from each other are shown larger than usually necessary. Generally speaking, by using fine printed circuits with a small insulating distance to each other, practically any conductive particles of even very small size can be detected. Furthermore, the printed circuits may have any other suitable configuration or shape.

In operation, metal particles deposited at the surface 210 and bridging the insulating space between the first network 211 and the second network 213, close the circuit 217 including the light 219 or other means for indicating a current, which then lights up signaling the presence of conductive particles. The air introduced through surface 210 and through the networks 211, 213 cause metal particles to settle downward much easier and to form a bridge between the networks 211, 213.

FIG. 3 illustrates an apparatus for detecting electrically conductive particles which comprises a surface 310 supporting electrically non-conductive fluid material containing tramp metal or other electrically conductive particles. The apparatus has electrically conductive first elements 312 extending across said surface 310 and connected to one terminal of a battery 318 or another electric energy source, thus being at a defined electric potential. Electrically conductive second elements 314 extend across the surface 310, are separated from the first elements 312 by insulating spaces and are connected to the other terminal of the battery 318, thus being at an electric potential different from that of the first elements 312. The first elements 312 are spaced from each other, and the second elements 314 are spaced from each other and from the first elements 312. The surface 310 is gas-permeable; a tubing 326 and a cover 327 are provided for introducing air or another gas through the surface 310 into the fluid material.

In operation, metal particles forming a bridge over an insulating space between first elements 312 and second elements 314 close the circuit 317 from one terminal of the battery 318 and first elements 312 through that bridge to second elements 314 and the other terminal of the battery 318. The current is indicated by the electric light 319. By introducing air through the tubing 326, metal particles settle downward much easier.

In this embodiment the surface 310 may be electrically conductive or non-conductive. If conductive, it may be electrically connected with the grounded terminal of the electric energy source, and either with the second elements 314 or the first elements 312. Or the surface 310, if conductive, may be connected to one terminal of the electric energy source, usually the grounded one, while the first elements 312 and the second elements 314 are connected to the other terminal of the electric energy source and are thus at the same electric potential.

Figure 4:
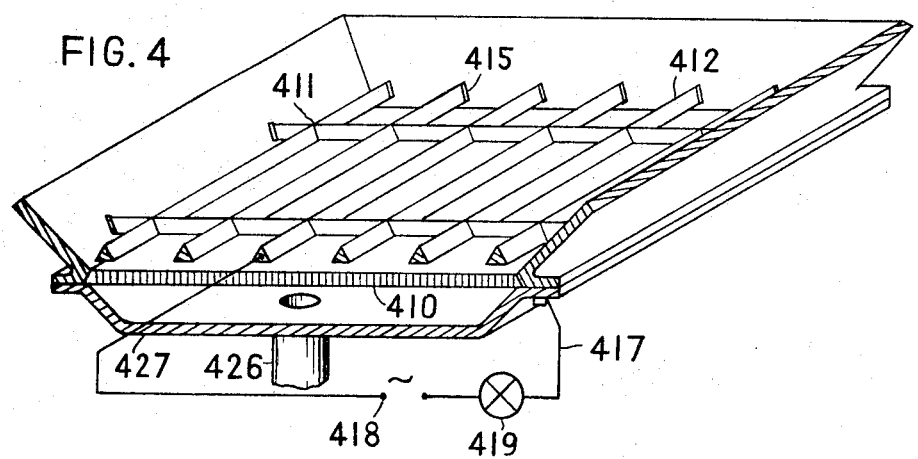
FIG. 4 is a perspective view of another embodiment, partly in section.

FIG. 4 shows an apparatus for detecting electrically conductive particles which comprises an electrically conductive surface 410 supporting fluid material which is electrically non-conductive but contains tramp metal or other electrically conductive particles. The surface 410 is connected to one terminal of an electric energy source 418 and thus is at a defined electric potential. The surface 410 is gas-permeable and a duct 426 and a cover 427 or other means, are provided for introducing a gas through the surface 410 into the fluid material. A grid network 411 of electrically conductive elements 412 extends across and above the surface 410 and is insulated from the surface 410 by a space therebetween and by insulating end caps 415. The grid network 411 is connected to the other terminal of the electric energy source 418 and is thus at an electric potential different from that of the surface 410.

In operation, tramp metal and other electrically conductive particles settle to the surface 410, form a bridge between the surface 410 and the grid network 411 and close the circuit 417 from one terminal of the electric energy source 418 and the surface 410 through that bridge to the grid network 411 and the other terminal of the electric energy source 418. The circuit 417 includes an electric light 419 or other means for indicating an electric current.

Figure 5:
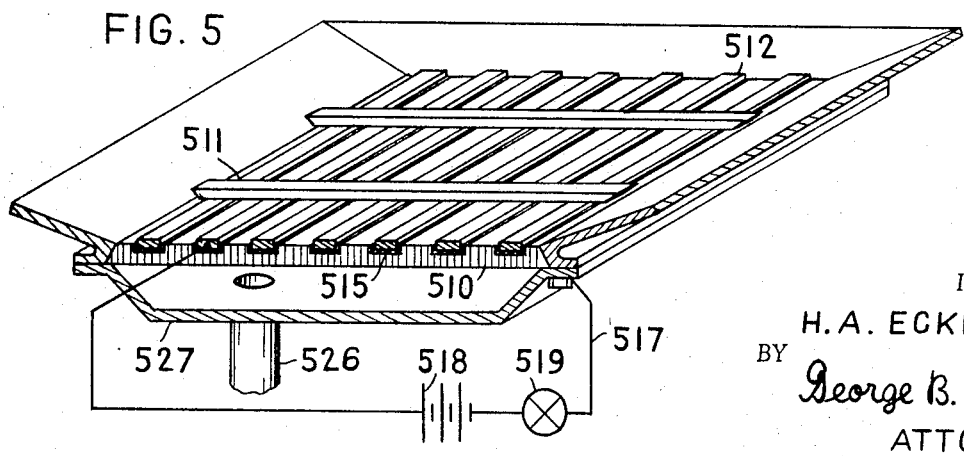
FIG. 5 is a perspective view of a still further embodiment with parts broken away.

FIG. 5 illustrates an apparatus for detecting tramp metal which comprises a metal surface 510 supporting non-conductive fluid material containing tramp metal or other electrically conductive particles. The surface 510 is connected by the circuit 517 to one terminal of the battery 518 and thus is at a defined electric potential. A grid network 511 of metal elements 512 extends across the surface 510, is embedded in the surface 510 and is insulated from the surface 510 by insulating material 515. The network 511 is connected to the other terminal of the battery 518 and thus is at an electric potential different from that of the surface 510. The surface 510, the elements 512 of the network 511 and the insulation 515 are gas-permeable, and a duct 526, a cover 527, and other means (not shown) for introducing air through the surface 510 into the fluid material are provided.

In operation, tramp metal settling down to the surface 510 form a bridge between the surface 510 and the network 511 and close the circuit 517 from one terminal of the battery 518 and the surface 510 through that bridge to the network 511 and the other terminal of the battery 518. The circuit 517 includes an electric light 519 or other means for indicating a current.

In the embodiments of FIGS. 3 and 4 the surfaces 310 and 410 respectively may comprise flexible portions so that by varying the introduced air such flexible portions are brought closer to or farther away from the elements 312, 314 and 412 respectively. By such movement of portions of the surfaces 310, 410, the tramp metal deposited there will move in an analogous manner, and the variation of the current in the indicator 319 or 419 respectively permits to draw conclusions as to the quantity, size and type of tramp metal present.

In the various embodiments the conductive elements are shown with certain cross sections which may be exchanged for any other cross section such as oval, oblong, diamond or drop shapes.

In the various embodiments the size of the conductive elements and of the spaces separating them are shown as relatively large in the interest of clear illustration. It is understood that the conductive elements and the spaces separating them from each other or from the supporting surface may have any minute size in order to detect and to remove even minute metal particles such as filings.

It is further understood that the various embodiments shown may represent the bottom of processing equipment or of a container connected to the upper part thereof by a hinge which permits to remove the tramp metal after being detected, preferably with a valve or gate above that bottom so that the bottom can be detached and the tramp metal removed without removing larger portions of the fluid material.

In the various embodiments air or gas may be introduced which is heated or cooled, dryed or otherwise preconditioned to achieve heating, cooling, drying or other effects on the fluid material.

Several surfaces are shown as being provided for sealing against fluid material, air or other gases. The seals, however, are not shown in the interest of clarity. Also not shown are bolts, screws and nuts to connect parts shown as being provided with flanges for such connections.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. Apparatus for detecting electrically conductive particles comprising an electrically insulating surface supporting and impermeable to electrically non-conductive particulate material and electrically conductive particles contained therein, said surface being also impermeable to liquids, but permeable to gases a first network of electrically conductive elongated first elements extending longitudinally across and recessed in said surface, said first network being at a defined electric potential, and connected to one terminal of an electric energy source;

a second network of electrically conductive elongated second elements extending longitudinally across and recessed in said surface, being separated from said first network by insulating spaces, at an electric potential different from that of the first network, and connected to another terminal of the electric energy source, so that electrically conductive particles deposited at said surface form a bridge over an insulating space between said first network and said second network and close a circuit from said one terminal and said first network through said bridge to said second network and said other terminal, said circuit including means for indicating a current.

2. Apparatus for detecting electrically conductive particles comprising a surface supporting and impermeable to electrically non-conductive particulate material and electrically conductive particles contained therein, a first network of electrically conductive first elements extending across said surface, said first network being at a defined electric potential, and connected to one terminal of an electric energy source;

a second network of electrically conductive second elements extending across said surface, being separated from said first network by insulating spaces, at an electric potential different from that of the first network, and connected to another terminal of the electric energy source, so that electrically conductive particles deposited at said surface form a bridge over an insulating space between said first network and said second network and close a circuit from said one terminal and said first network through said bridge to said second network and said other terminal, said circuit including means for indicating a current, said first and second elements comprise electrically conductive laminae of a laminated magnet, the odd and even numbered laminae alternately connected to said two terminals of said electric energy source, said insulating spaces comprising the insulation between said laminae, so that electrically conductive particles forming a bridge across an insulating space between said odd numbered laminae connected to said one terminal and said even numbered laminae connected to said other terminal of said electric energy source, close an electric circuit from said one terminal and said odd numbered laminae through said bridge to said even numbered laminae and said other terminal.

3. Apparatus for detecting electrically conductive particles as claimed in claim 2 wherein the insulation between said odd numbered laminae and said even numbered laminae extends to a level below said surface formed by said laminated magnet.

4. Apparatus for detecting electrically conductive particles as claimed in claim 2 wherein an opening extends through said laminated magnet traversing said laminae, said opening being connected to means for introducing a gas, the insulation between said laminae recessed in an area between said opening and the upper edges of said laminae, so that gas introduced into said opening flows through said area between said laminae.

5. Apparatus for detecting electrically conductive particles as claimed in claim 4 wherein said opening has a gas-permeable electrically non-conductive liner with passages smaller than the size of the smallest particles of said particulate material and of said electrically conductive particles, so that said particles are prevented from getting from said surface between said laminae through said liner into said opening.

6. Apparatus for detecting electrically conductive particles as claimed in claim 2 wherein the upper edges of the laminae on one pole of said laminated magnet form one area of said surface, and the upper edges of the laminae on the other pole of said laminated magnet form another area of said surface, the portion of said surface between said areas descending in height toward said areas, so that magnetic, electrically conductive particles are pulled by magnetic and gravity forces toward one of said areas where they form a bridge across said insulation between odd and even numbered laminae on one of said poles, and non-magnetic, electrically conductive particles are pulled by gravity forces toward one of said areas where they form a bridge across said insulation between odd and even numbered laminae on one of said poles.

7. Apparatus for detecting electrically conductive particles as claimed in claim 6 wherein the upper edges of the laminae in said one area decrease in height toward said other area and the upper edges of the laminae in said other area decrease in height toward said one area.

8. Apparatus for detecting electrically conductive particles as claimed in claim 2 wherein said laminae of said magnet form areas of the surface supporting the particulate material and electrically conductive particles contained therein, said laminated magnet carries a primary winding connected to the terminals of an electric voltage source, and a secondary winding connected to means for indicating a current, so that metal particles in the particulate material at said laminae change the magnetic field of the laminated magnet and the induced electric current through the secondary winding and the current indicating means.

9. Apparatus for detecting electrically conductive particles as claimed in claim 8 wherein a second magnet, the comparative magnet carries a separate primary winding, the primary comparative winding, connected to the terminals of the alternating voltage source to which is connected the primary winding of the laminated magnet forming areas of the surface supporting the particulate material, said comparative magnet having a separate secondary winding, the secondary comparative winding, the secondary windings of said laminated magnet and of said comparative magnet connected in opposition and in series in a secondary circuit to said means for indicating a current, their induced voltages adjusted to cancel each other resulting in zero voltage, so that an electrically conductive particle changing the magnetic field of said laminated magnet supporting the particulate material changes the voltage induced in said secondary winding, thus ceasing to balance the voltage induced in said secondary comparative winding, resulting in a voltage and a current in said secondary circuit through the current indicating means thus indicating the presence of said particle.

10. Apparatus for detecting electrically conductive particles as claimed in claim 8 wherein a second laminated magnet, the comparative magnet, has laminae extending across and forming other areas of said surface supporting the particulate material and electrically conductive particles contained therein, said laminae alternately connected to two terminals of an electric energy source, said comparative magnet having a primary winding, the primary comparative winding, connected to the terminals of the electric voltage source, and a secondary winding, the secondary comparative winding, said primary comparative winding inducing into said secondary comparative winding a voltage changed by particles changing the magnetic field of said comparative magnet, the secondary windings of said magnet and of said comparative magnet connected in opposition and in series in a secondary circuit to said means for indicating a current, their induced voltages adjusted to cancel out each other thus resulting in zero voltage, so that an electrically conductive particle changing the magnetic field of one of said magnets changes the voltage induced in the secondary winding thereof, thus ceasing to balance the voltage induced in the secondary winding of the other of said magnets, and resulting in a voltage and a current in said secondary circuit through the current indicating means thus indicating the presence of said particle.

11. Apparatus for detecting electrically conductive particles as claimed in claim 1 wherein said electrically conductive first elements extend across the surface supporting and impermeable to the particulate material and are spaced from each other, said electrically conductive second elements extending across said surface and being spaced from each other and from said first elements.

12. Apparatus for detecting electrically conductive particles as claimed in claim 11 wherein
means are provided for introducing a gas through said surface into said particulate material,
so that electrically conductive particles settle to said surface and form a bridge between said first elements and said second elements.

13. Apparatus for detecting electrically conductive particles as claimed in claim 1 wherein
said first network and said second network comprise conductive material connected to the surface by a method selected from the methods of printing and bonding.

14. Apparatus for detecting electrically conductive particles as claimed in claim 13 wherein
means are provided for introducing a gas through said surface into said particulate material,
so that electrically conductive particles settle to said surface and form a bridge between said first network and said second network.

15. Apparatus for detecting electrically conductive particles as claimed in claim 14 wherein
said first network and said second network comprise gas-permeable material,
so that gas is introduced through the gas-permeable surface supporting and impermeable to the particulate material, and through said gas-permeable first and second network into said particulate material.

16. Apparatus for detecting electrically conductive particles comprising
an electrically conductive surface supporting and impermeable to electrically non-conductive particulate material containing electrically conductive particles, said surface being impermeable to liquids, but permeable to gases and at a defined electric potential and connected to one terminal of an electric energy source,
a network of electrically conductive elongated elements extending longitudinally across said surface, being insulated from said surface, and at an electric potential different from the potential of said surface, and connected to an other terminal of said electric energy source,
so that electrically conductive particles forming a bridge between said network and said surface close a circuit from said one terminal and said surface through said bridge to said network and said other terminal, said circuit including means for indicating a current.

17. Apparatus for detecting electrically conductive particles as claimed in claim 16 wherein
said network extends across and above said surface, and is insulated from said surface by a space therebetween.

18. Apparatus for detecting electrically conductive particles as claimed in claim 17 wherein
said network of conductive elements are spaced a distance smaller than the largest conductive particle from the surface supporting and impermeable to the particulate material,
so that electrically conductive particles forming a bridge between said surface and one of said elements close said circuit.

19. Apparatus for detecting electrically conductive particles as claimed in claim 16 wherein
said network is recessed in said surface and is insulated from said surface by insulating material.

20. Apparatus for detecting electrically conductive particles as claimed in claim 16 wherein
means are provided for introducing a gas through said surface into said particulate material,
so that electrically conductive particles settle to said surface and form a bridge between said surface and said network.

21. Apparatus for detecting electrically conductive particles as claimed in claim 20 wherein
said network, and said insulating material are also gas-permeable,
means being provided for introducing a gas through said surface, network and insulation into said particulate material.

22. Apparatus for detecting electrically conductive particles as claimed in claim 16 wherein
said network is attached to said surface by an adhesive forming said insulation.

23. Apparatus for detecting electrically conductive particles as claimed in claim 22 wherein
means are provided for introducing a gas through said surface into said particulate material.

* * * * *